(12) United States Patent
Linder

(10) Patent No.: US 10,982,776 B2
(45) Date of Patent: Apr. 20, 2021

(54) REPLACEABLE SEAT POCKET ASSEMBLY

(71) Applicant: AWC Frac Valves Inc., Conroe, TX (US)

(72) Inventor: Scott Linder, Conroe, TX (US)

(73) Assignee: AWC Frac Valves Inc., Conroe, TX (US)

( * ) Notice: Subject to any disclaimer, the term of this patent is extended or adjusted under 35 U.S.C. 154(b) by 0 days.

(21) Appl. No.: 16/436,444

(22) Filed: Jun. 10, 2019

(65) Prior Publication Data
US 2019/0293186 A1  Sep. 26, 2019

Related U.S. Application Data

(63) Continuation of application No. 15/987,298, filed on May 23, 2018, now Pat. No. 10,316,976, which is a continuation of application No. PCT/IB2017/057195, filed on Nov. 17, 2017.

(30) Foreign Application Priority Data

Nov. 23, 2016  (NO) .................................. 20161861

(51) Int. Cl.
*F16K 3/02* (2006.01)
*F16K 3/20* (2006.01)

(52) U.S. Cl.
CPC .......... *F16K 3/0227* (2013.01); *F16K 3/0236* (2013.01); *F16K 3/20* (2013.01)

(58) Field of Classification Search
CPC ........ F16K 3/0227; F16K 3/0236; F16K 3/20; F16K 3/0272; E21B 34/02
See application file for complete search history.

(56) References Cited

U.S. PATENT DOCUMENTS 1,708,851 A ‡ 4/1920 Sparks ...................... F16K 3/12
                                                        251/328
3,746,305 A ‡ 7/1973 Zakka ...................... F16K 1/422
                                                        251/36

(Continued)

FOREIGN PATENT DOCUMENTS

GB  1241022 A ‡ 7/1971 ........... F16K 3/0227
GB  1241022 A    7/1971

OTHER PUBLICATIONS

Office Action dated May 31, 2017 for corresponding Norwegian Patent Application No. 20161861 and English translation, 10 pages.‡

(Continued)

*Primary Examiner* — Eric Keasel
(74) *Attorney, Agent, or Firm* — Harper Bates & Champion LLP; Shannon W. Bates

(57) ABSTRACT

A replaceable seat pocket assembly (10) for a gate valve body, the valve body comprises a recess (13) forming a seat pocket interface around the flow bore (B) by the gate opening, the seat pocket assembly (10) is arranged to be replaceable and comprises a ring shaped replaceable seat face ring (1), an energizing retaining collar (3) provided with threads. The invention also comprises a tool (1000) for replacing the replaceable seat pocket assembly, and also a kit and a method for installation of the replaceable seat pocket assembly.

9 Claims, 17 Drawing Sheets

(56) References Cited

U.S. PATENT DOCUMENTS

| | | | | |
|---|---|---|---|---|
| 4,124,194 | A | ‡ | 11/1978 | Alvarez ................ F16K 3/186 251/15 |
| 4,313,458 | A | ‡ | 2/1982 | Burns ................... F16K 3/16 137/32 |
| 4,376,526 | A | * | 3/1983 | Freeman ............... F16K 3/02 251/167 |
| 4,519,582 | A | ‡ | 5/1985 | Freeman ............... F16K 3/02 251/16 |
| 9,453,578 | B2 | ‡ | 9/2016 | Sundararajan ........ F16K 3/0236 |
| 2003/0015681 | A1 | ‡ | 1/2003 | Chatufale ............. F16K 3/0227 251/32 |
| 2008/0164437 | A1 | ‡ | 7/2008 | Lam .................... F16K 3/0227 251/32 |
| 2009/0095934 | A1 | ‡ | 4/2009 | Cain ................... F16K 3/0227 251/32 |
| 2015/0014568 | A1 | ‡ | 1/2015 | Sundararajan ........ F16K 3/0236 251/328 |

OTHER PUBLICATIONS

International Search Report and Written Opinion dated Mar. 14, 2018 for corresponding WO Application No. PCT/IB2017/057195, 9 pages.‡

International Preliminary Report on Patentability dated Oct. 18, 2018 for corresponding WO Application No. PCT/IB2017/057195, 16 pages.

\* cited by examiner
‡ imported from a related application

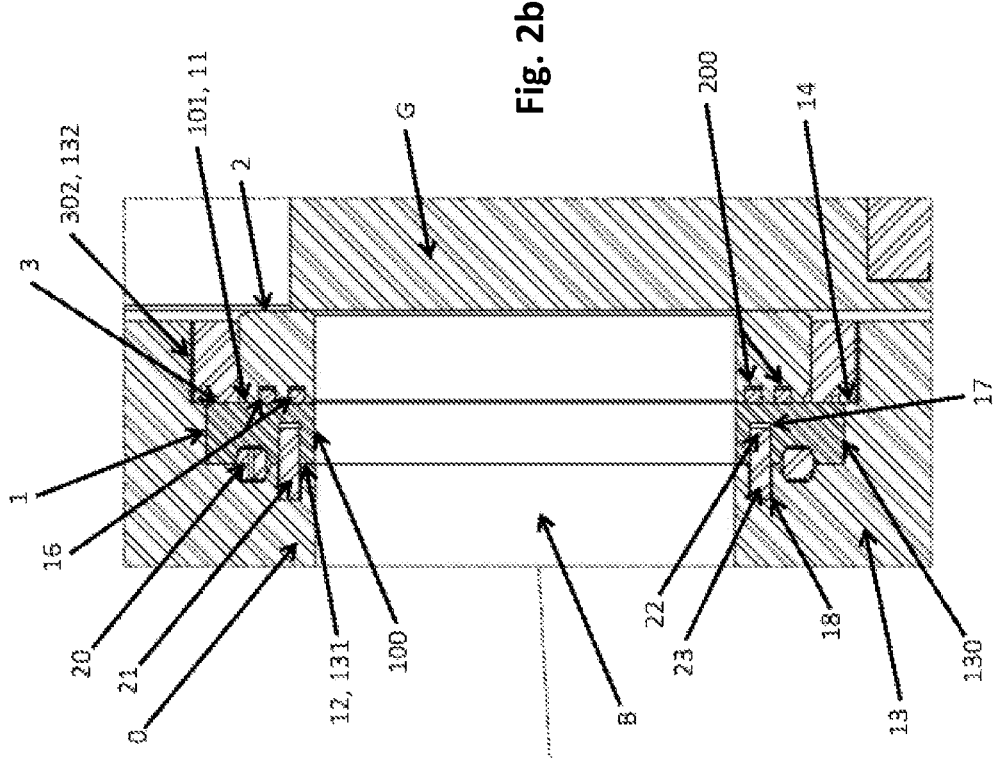
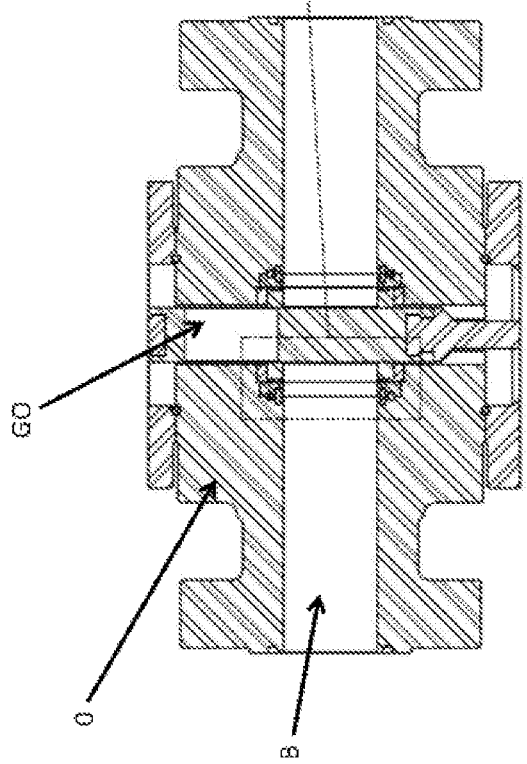
Fig. 2b
Fig. 2a

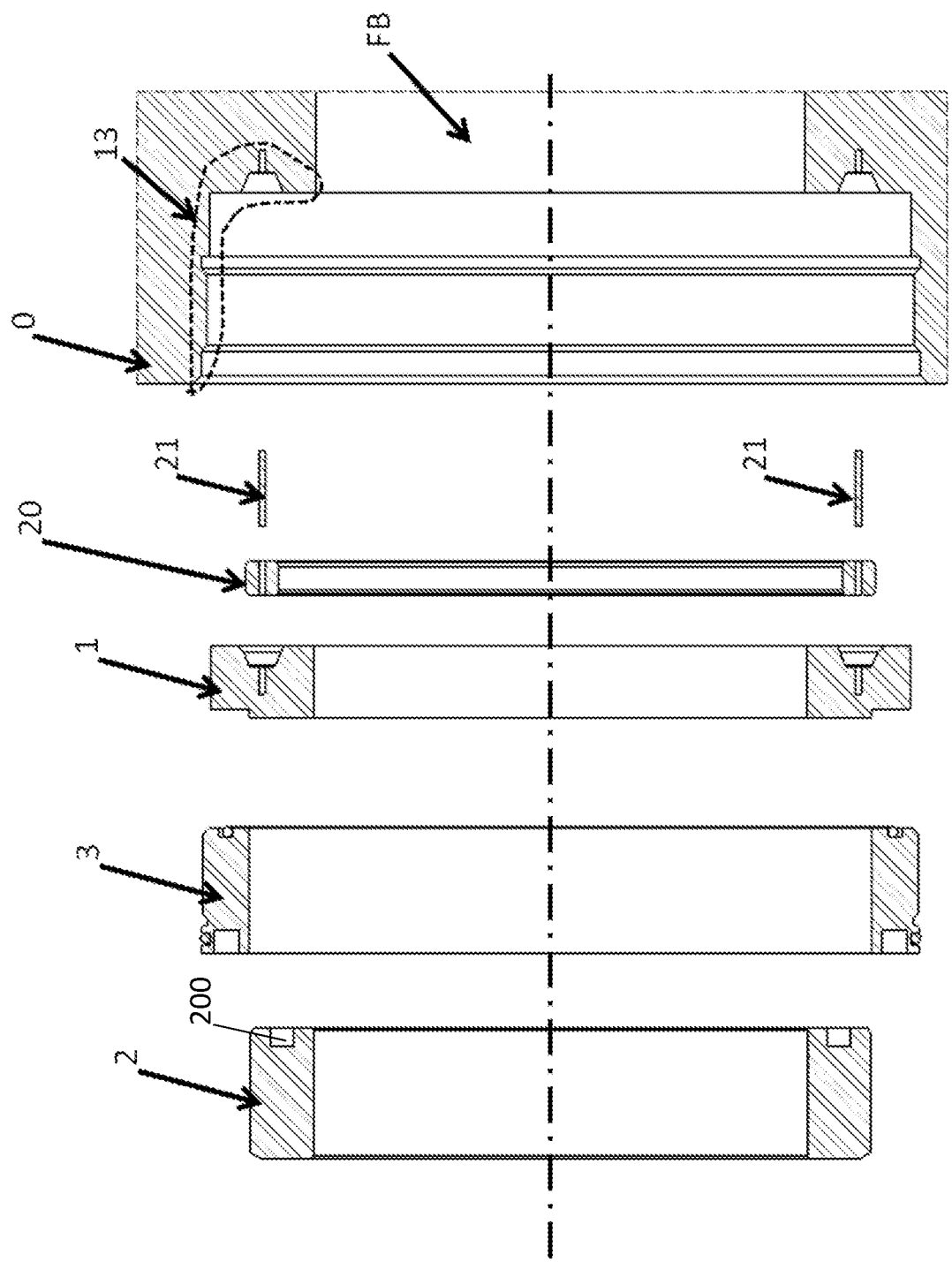

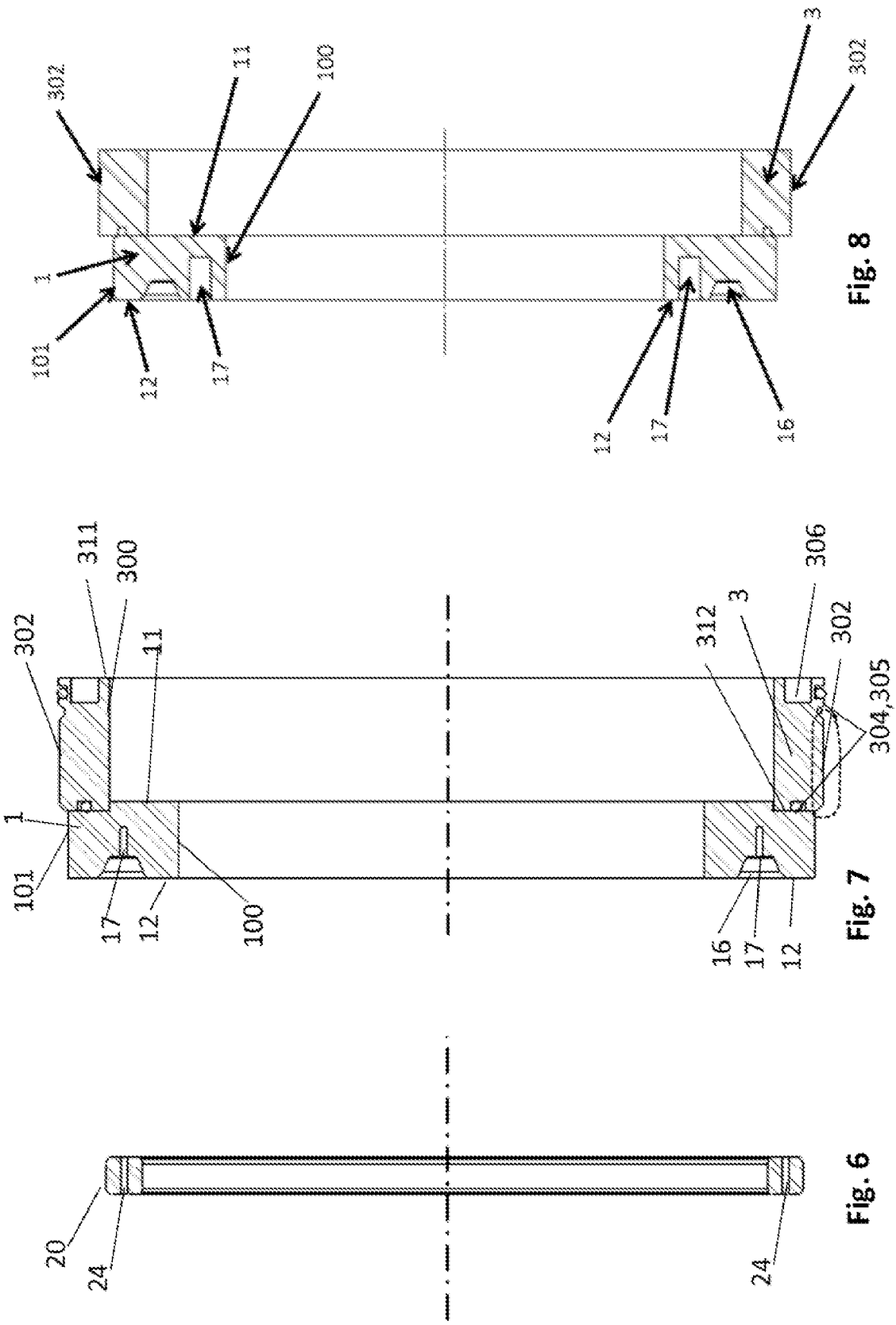

REPLACEABLE SEAT POCKET ASSEMBLY

CROSS-REFERENCE TO RELATED APPLICATIONS

This application is a continuation of U.S. patent application Ser. No. 15/987,298, filed May 23, 2018 and entitled "Replaceable Seat Pocket Assembly," which is a bypass continuation of PCT Application No. PCT/IB2017/057195, filed Nov. 17, 2017, which is based on and claims the benefit of priority from Norway Patent Application No. 20161861, filed on Nov. 23, 2016, each of which is incorporated by reference herein in its entirety for all purposes.

BACKGROUND

The purpose of a gate valve is to control the flow of production fluids into or out of a well. Gate valves can be operated in various ways such as manually, hydraulically, pneumatically, and electrically. All operational models provide on-off flow control by aligning the gate, seat, and body flow bores (open) or aligning the solid part of the gate with the seat and body flow bores (closed). The gate makes a metal-to-metal seal with the seat and the seat makes a metal-to-metal and/or elastomeric seal with the valve body. Gate valves typically have a floating seat that is not rigidly held in place and the seat is captured within the seat pocket that has traditionally been a feature machined into the valve body. To operate the valve, the gate is moved up or down to either open or close the flow path.

Due to flow through the gate bore, movable parts, and operation of the valve there will be wear around the valve seat and even break downs and thus need for expensive maintenance and repair of the valve.

The patent application US2003015681 describes a valve sealing assembly comprising a first seat member (a pocket insert) and a second seat member (seat), with rear sealing rings and exterior annular retainer rings. The retainer ring on the pocket insert retains the pocket insert in the valve body and the retainer ring on the seat retains the seat in the pocket insert. The pocket insert comprises an exterior annular groove arranged to accommodate the retainer ring. The retainer ring is made of a flexible material, slightly oversized, to exert a force to the valve body and retain the pocket insert in the valve body. The retainer ring does not provide a seal but is preferably split to allow fluid flow around the ring. The pocket insert has an L-shaped cross section and accommodate the seat and make the interface between the seat and the valve body. The use of elastomeric seals requires low energization and seat may be press fitted as is or press fit using a retaining collar. This is a disadvantage due to the risk that it may loosen unexpectedly causing the system to be a seat, floating in a seat, floating in a seat pocket. Where "floating" is contained or captured but not rigidly restrained.

SUMMARY OF THE INVENTION

A main object of the present invention is to disclose a gate valve insertion that solves the problems mentioned above, a tool for installing such an insert and a method for installation of the insert. The invention describes a kit for this.

The invention is a replaceable seat pocket assembly suitable for a gate valve comprising a gate valve body, a flow bore, a gate opening, a gate and a gate cavity, the valve body comprises a recess forming a replaceable seat pocket interface around the flow bore by the gate opening, the recess having a rear wall and an inward facing circumferential side wall with a threaded portion close to the gate opening;

the seat pocket assembly comprises
a replaceable seat face ring with a front and a reverse side,
an outer circumference wall and an inner circumference wall (100)
wherein the reverse side is for sealing arrangement to the rear wall and the outer circumference wall is for tight fitting arrangement to the inward facing circumferential side wall,
an energizing retaining collar (ERC)
for arrangement onto an outer circumferential portion of the front of the replaceable seat face ring,
the energizing retaining collar having a threaded outer circumferential wall to interact with the threaded portion,
the replaceable seat face ring and the energizing retaining collar thus forming the replaceable seat pocket assembly for arrangement as an interface between the valve seat and the gate valve body.

Such a replaceable seat pocket facilitates an easy maintenance and repair, just changing seat pocket insert instead of machining, welding, heat treating, and finish machining with carbon/low alloy, stainless, or CRAs. The repair will be much more cost and time efficient than for a valve without a replaceable seat pocket.

The retaining collar (3) and the seat face ring (1) provides a fixed but replaceable seat pocket. Thus wear is limited to inside the replaceable seat pocket, with significantly reduced wear to the main valve body, is a resulting advantage. The use of a metal to metal seal energized by the ERC is far more rigid and robust than a press fit cup design with elastomeric seals.

The invention is also a replaceable seat pocket assembly installation tool for a replaceable seat pocket, please see FIG. 11 and FIG. 12, comprising:

an extension rod and a torque key;
the extension rod having a first end arranged for engagement with the torque key, and a second end with a bolt head such as for a hydraulic torque tool;
the torque key being generally circular with a central engagement slot for engagement with the first end, and two or more arc-shaped load dogs on an outer circumference of the torque key, the load dogs arranged for engagement with one or more corresponding arc-shaped load slots in an energizing retainer collar of the replaceable seat pocket assembly.

The invention also relates to a method for installing a replaceable seat pocket assembly in a gate valve comprising a gate valve body, a flow bore, a gate opening, a gate, a gate cavity, the valve body comprises a seat pocket interface recess forming a replaceable around the flow bore by the gate opening, the recess having a rear wall and an inward facing circumferential side wall with a threaded portion close to the gate opening, please see FIG. 14;

operating through the gate cavity:
placing a seal ring into a groove in the rear wall of the recess,
placing a ring shaped replaceable seat face ring with a front and a reverse side (12), an outer circumference wall and an inner circumference wall with the reverse side facing the seal ring and the rear wall,
arranging an energizing retaining collar (ERC) onto an outer circumferential portion of the front of the seat replaceable face ring, by engaging a threaded outer circumferential wall of the energizing retaining collar with the threaded portion in the recess,
inserting a circular torque key with one or more arc-shaped load dogs on its outer circumference and engaging the load dogs with one or more corresponding arc-shaped load slots in the energizing retainer collar, then operating through the flow bore inserting an extension rod through the flow bore, engaging a first end of the extension rod into a central engagement slot of the torque key and using a torque tool engaging a bolt head on a second end of the extension rod and operating the hydraulic tool and tighten to a required torque.

BRIEF DESCRIPTION OF THE DRAWINGS

The attached figures illustrate some embodiments of the claimed invention:

FIG. 1a is section cut through a gate valve with a replaceable seat pocket, an RSP (1, 3), according to an embodiment of the invention.

FIG. 1b shows the detail indicated in FIG. 1a.

FIG. 2a is section cut through a gate valve with a replaceable seat pocket (1, 3) according to another embodiment of the invention.

FIG. 2b shows the detail outlined in FIG. 2a.

FIG. 3 is a combined section view and exploded view of the embodiment of FIG. 1a.

FIG. 6 is a section view and part elevation view of an embodiment of the seal ring (20). Here the illustrated section is cut through two through-holes (24) for the locking pins (21).

FIG. 7 is a detail section of the replaceable seat face ring (1) and the energizing collar (3) according to the embodiment of FIG. 1a. the term "Energizing" is used for screwing in the collar (3) thus moving the seat face ring (1) inwardly to compress the seal ring (20), thus supplying mechanical energy to the seal ring (20).

FIG. 8 is a detail section of the replaceable seat face ring (1) and the energizing collar (3) according to embodiment of FIG. 2a.

EMBODIMENTS OF THE INVENTION

Figures 1A, 1B:
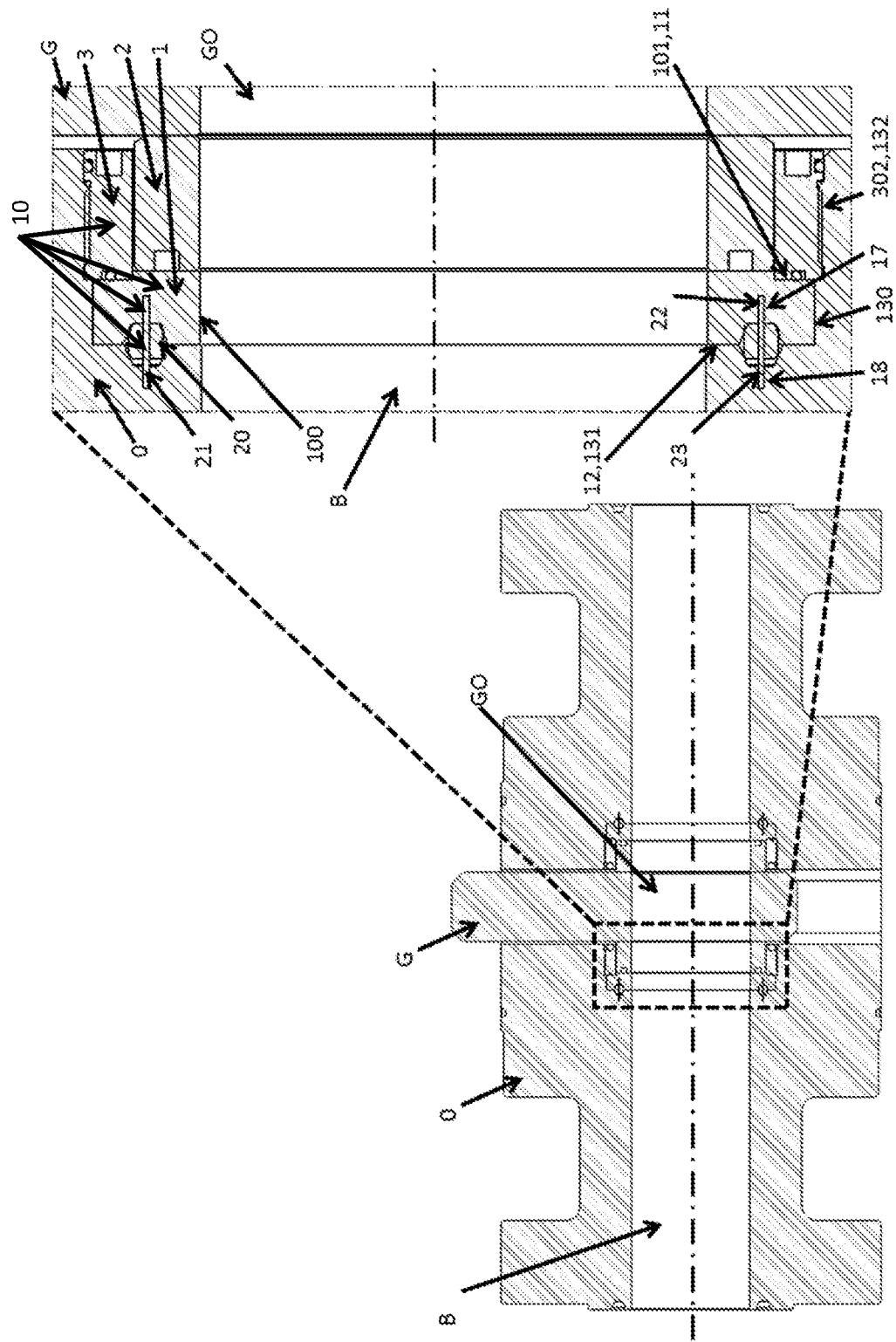
Figure 5:
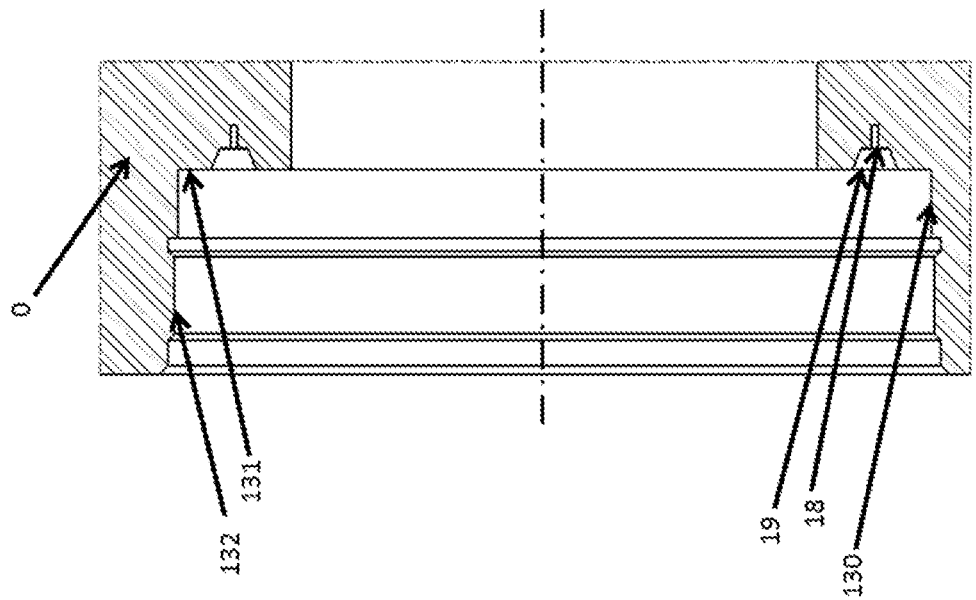
FIG. 5 shows the embodiment as in FIG. 1a but with the gate (G) and seat (2) removed.
Figure 4:
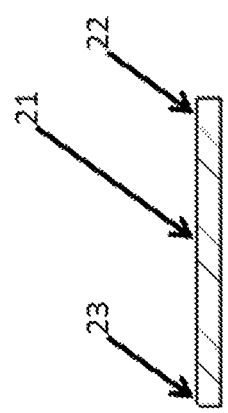
FIG. 4 is a longitudinal section view of a locking pin (21) for preventing rotation of the replaceable seat pocket (1, 3).
Figure 9:
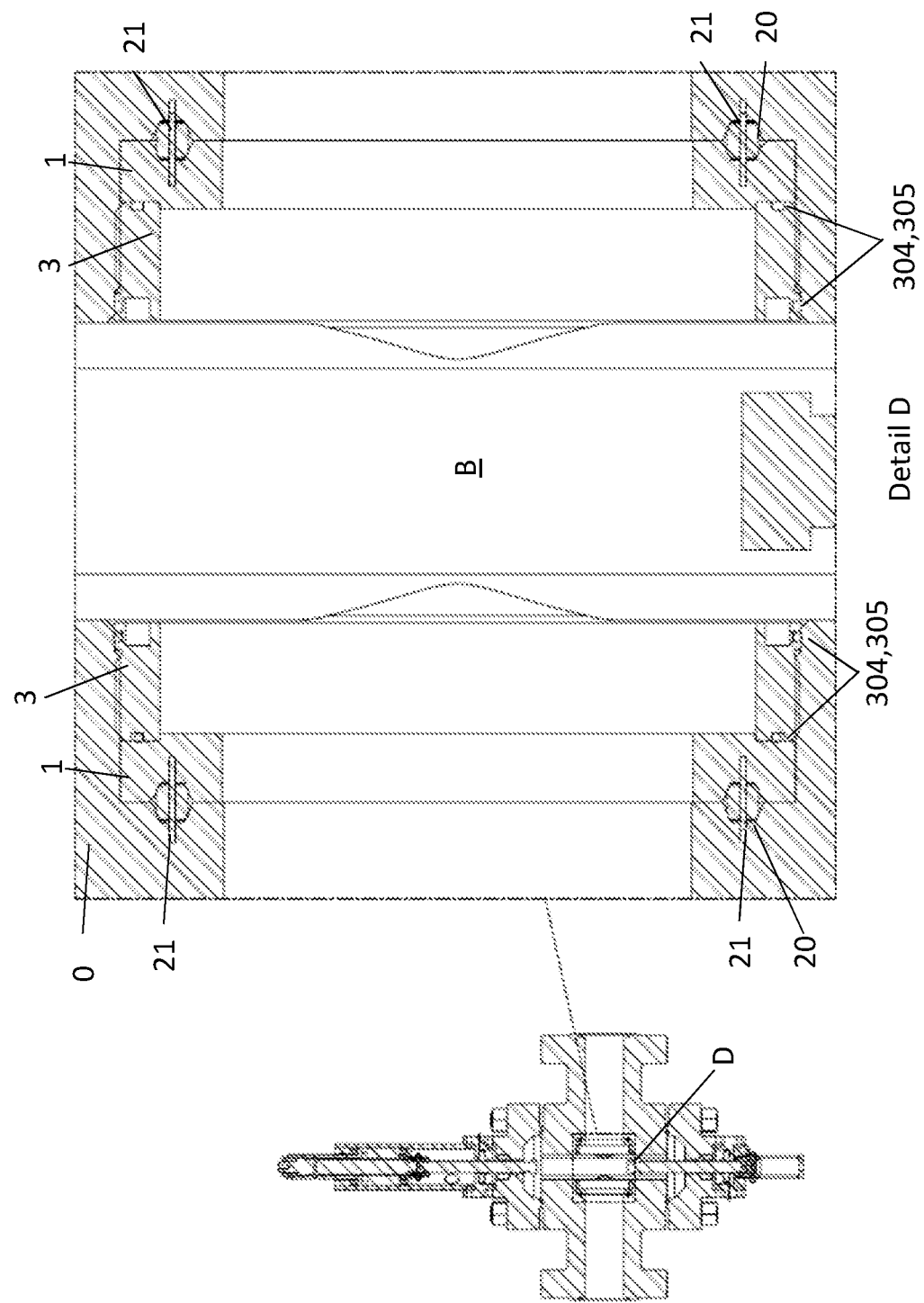
FIG. 9 is a section view of a gate valve with a replaceable seat pocket (1, 3) according to an embodiment of the invention. The gate (G) and the seat (2) are not shown. The right portion of the drawing is enlarged detail D from the overview section in the left portion of the sheet.
Figure 10:
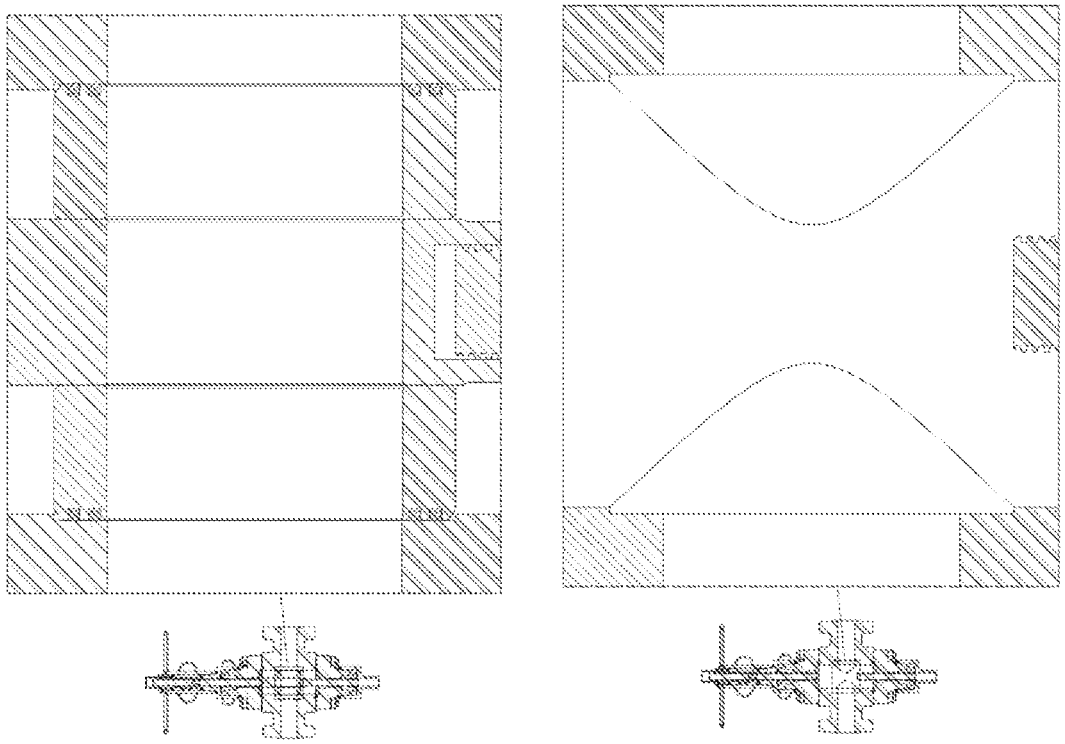
FIG. 10 is a section view of a traditional gate valve (Prior art). The upper illustration is a gate valve in an open position, and in the lower illustration the gate and the seat are removed.
Figure 11:
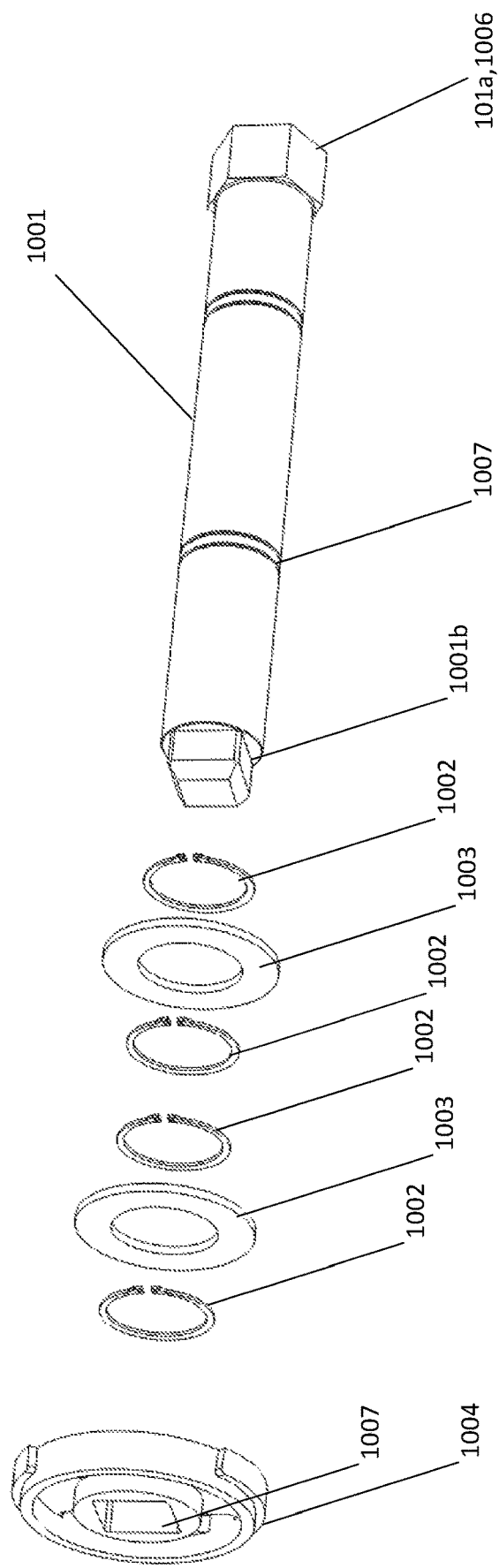
FIG. 11 is an embodiment of the invention, a replaceable seat pocket assembly installation tool (1000), here shown in an exploded view. The ring (1004) to the left shall engage with the energizing collar (3) for screwing it in or unscrewing it.

The invention will in the following be described and embodiments of the invention will be explained with reference to the accompanying drawings. A precision machined metal ring (1) rigidly interfaces with the valve body (0). The seat (2) facing side of the replaceable seat pocket assembly (1, 3) is precision machined smooth and flat, providing a sealing surface, preferably metal, at least having the same sealing properties to the seat pocket that is traditionally machined into the body. The precision machined inside diameter of the retaining collar (ERC) (3) provides radial guidance for the floating seat (2). Together these components completely replace the traditional seat pocket and provide for a significant improvement to time and cost of repair. More specifically the invention is a replaceable seat pocket assembly (10) suitable for a gate valve comprising a gate valve body (0), a flow bore (B), a gate opening (GO), a gate (G) and a gate cavity (GC), said valve body comprises a recess (13) forming a replaceable seat pocket interface around said flow bore (B) by said gate opening (GO), said recess (13) having a rear wall (131) and an inward facing circumferential side wall (130) with a threaded portion (132) close to the gate opening (GO);

said seat pocket assembly (10) comprises a replaceable seat face ring (1) with a front (11) and a reverse side (12), an outer circumference wall (101) and an inner circumference wall (100)

wherein said reverse side (12) is for sealing arrangement to said rear wall (131) and said outer circumference wall (101) is for tight fitting arrangement to said inward facing circumferential side wall (130), an energizing retaining collar (ERC) (3) for arrangement onto an outer circumferential portion of said front (11) of said replaceable seat face ring (1), said energizing retaining collar (3) having a threaded outer circumferential wall (302) to interact with said threaded portion (132);

said replaceable seat face ring (1) and said energizing retaining collar (3) thus forming said replaceable seat pocket assembly (10) for arrangement as an interface between a valve seat (2) and said gate valve body (0).

The energizing retaining collar (3) will hold the replaceable seat pocket assembly (10) in place in the body (0). Please see FIGS. 1a and 1b. Generally front sides are related to access and opening point which for a gate valve will be the gate opening. As seen from FIGS. 7 and 8 the retaining collar (3) covers just a radially outer portion of the circular front (11) of the seat face ring (1). Together, the inner wall (300) of the energizing retaining collar ERC (3), the front (11) and the inner wall (100) of the RSF will form what is usually called the seat pocket.

In this way the ordinary seat pocket, a machined cave in the valve body for capturing the valve seat, is formed by two main features; a ring shaped replaceable seat face ring (RSF) (1) and an energizing retaining collar (ERC) (3). Together they form a cavity inside the valve; the valve seat pocket (10), for the valve seat (2), which is replaceable, a replaceable seat pocket, RSP (10). The seat will be retained floatingly arranged, free to rotate inside the seat pocket and may be any general seats for the purpose of a gate valve. The energizing retaining collar ERC (3) is locked in place by threads (302) arranged to mate with threads (132) in a portion of the valve body facing towards the energizing retaining collar ERC (3), the replaceable seat pocket interface (13). The threads are a cost effective way to assemble and compress the two components. It provides and maintains, by torque and through the threads, the required large energizing forces and the threads provide a rigidly restrained interface that will not allow floating. (Thus called an energizing retaining collar.) Thus advantageous above bolt squeezing, flange-like fixing of the replaceable seat face ring RSF(1)P and easier to operate than compressing with a hydraulic cylinder system and then lock in place by a final twist lock.

A gate valve for a replaceable seat pocket according to the invention will generally be manufactured to receive the replaceable seat pocket (1, 3). Which means it will be prepared with the special designed features such as having a recess (13) forming the replaceable seat pocket interface around said flow bore (B) and being manufactured with a threaded portion (132) and other features for accommodation of different portions of different embodiments of the replaceable seat pocket. In another aspect the replaceable seat pocket may be used for retrofit installations, which means that the valve body may post grinded and by that prepared for the special designed features such as having a recess (13) forming the replaceable seat pocket interface around said flow bore (B) and with the threaded portion (132) and further features for the accommodation of the different portions of the different embodiments of the replaceable seat pocket.

In an embodiment replaceable seat pocket arrangement according to the invention, a seal ring (20), please see FIG. 1b, FIG. 2a, FIG. 3, FIG. 6, FIG. 9, FIG. 14, is arranged between the replaceable seat face ring (1) and the rear wall (131) of said replaceable seat pocket interface recess (13). The replaceable seat pocket assembly (RSP) seals against the valve body with the seal ring (20) that is compressed, i.e. energized using the threads of the energizing retaining collar (ERC) (3). The energizing retaining collar (3) compresses the seal ring (20) between the ring-shaped replaceable seat face ring (RSF) (1) and the replaceable seat pocket interface recess (13) and compresses/energizes the seal ring (20) to prevent leakage. The valve body is always pressurized, during operation, i.e. in use, to upstream pressure. This seal ring provides a barrier against differential pressure and prevents flow between the replaceable seat pocket RSP (10) and the body. Floating gate valves seal on the downstream side and so this prevents flow from the body cavity and downstream toward a flange.

The seal ring (20) will be a metal seal ring in an embodiment of the invention. The use of a metal to metal seal energized by the ERC is far more rigid and robust than a press fit cup design with elastomeric seals.

For low pressure applications an elastomeric solution could work, but for high pressurized systems a metal ring is favourable.

In a preferable embodiment when a metal seal ring (20) is used, the seal ring is arranged in a cavity formed by opposite arranged ring shaped grooves (16,19) at said reverse side (12) of the seat face (1) and the rear wall (131) of said replaceable seat pocket interface recess (13) (respectively).

An embodiment of the replaceable seat pocket according to the invention comprises an anti-rotation lock (21, 18, 17) for said replaceable seat pocket (10). The anti-rotation lock prevents the seat pocket face ring (SPF) (1) and seal ring (20) from rotating and thus wear to seat, retaining collar and seat pocket. Actually it is also preventing galling and other damage to the seal ring (20) and seal ring grooves ((16, 19) during installation.

In an embodiment the anti-rotation lock (21, 18, 17) comprises at least one lock pin (21) arranged with a first end (22) in a hole (17) arranged in said reverse side (12) of said seat face ring (1), and an opposite second end (23) in an opposite arranged retaining hole (18) in the rear wall (131) of the seat pocket interface recess (13). Advantageously, more than one lock pin (21) may be used, for example a number of four, evenly distributed in 90 degree angles of the circumference of the seat pocket, or there may be six, eight, or more lock pins The lock pin and hole system may be in an embodiment be replaced by a slot/key design but this would not be as cost efficient as the pin system. Please see FIG. 2b illustrating an embodiment with at least two lock pins arranged closer to the center of the ring shaped replaceable seat face ring RSF (1) aside of the ring seal.

An embodiment of the replaceable seat pocket according to the invention comprises a seat pocket interface (13) comprising at least one collar landing rack/step (14) for the energizing collar (3) in the inward facing circumferential side wall (130) of said replaceable seat pocket interface recess (13). This forms a step for thread clearance but there may also be embodiments with a second step to allow for one or more trash seals.

In an embodiment of the replaceable seat pocket (10) according to the invention, the replaceable seat face ring (1) is made of metal, such as steel, stainless steel, or Inconel.

An embodiment of the invention having a seal ring (20) comprising at least one through-hole (24) for said lock pin (21) and retaining holes (17,18) arranged within said ring shaped grooves (16,19). Please see FIGS. 1b, 6 and 7. This means an embodiment where the pin anti-rotation lock system is through the seal ring (20) and its corresponding recesses (16, 19). The metal seal ring (20) cannot be allowed to rotate relative to either of its mating parts. Anti-rotation pins in both the replaceable seat face ring RSF (1) and the metal sealing ring (20) accomplishes this.

Putting the pins through the metal seal (20) reduces the space required in the body (0) and they will hold the seal (20) in place during assembly.

In embodiments of the replaceable seat pocket the energizing retaining collar (3) comprises one or more trash seals (304, 305) to an adjacent surface as illustrated in FIG. 7, arranged in one or more corresponding recesses of said energizing retainer collar (3). Such trash seals may be arranged in customized grooves in the energizing collar (3) surface facing towards the replaceable seat face ring or to the seat pocket interface wall.

The seat (2) may also be arranged with a seal (200) between said seat and the replaceable seat (RSF) face ring (1). Please see FIGS. 1 and 3. A seat for use with the RSP may be off the shelf, but may also be one of a special design for the RSP according to any embodiments of the invention.

A general design of a gate valve will have symmetric designs which means that an embodiment according to the invention is arranged for flow in either direction and comprises a replaceable seat pocket assembly (10) at both sides of said gate opening (GO).

Figure 12:
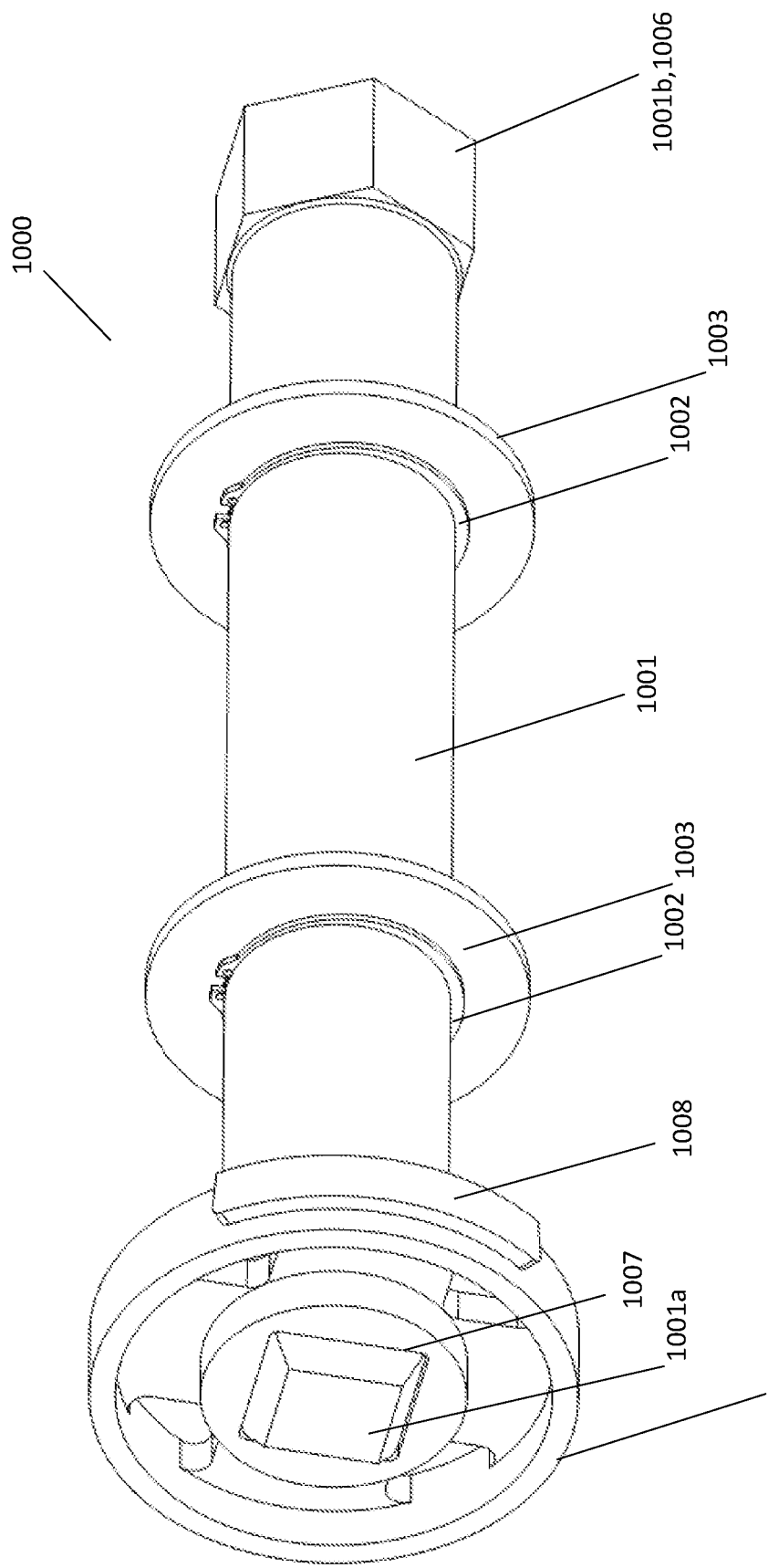
FIG. 12 is an embodiment of a replaceable seat pocket assembly installation tool (1000) in an assembled view as it will be assembled inside the valve body.
Figure 13:
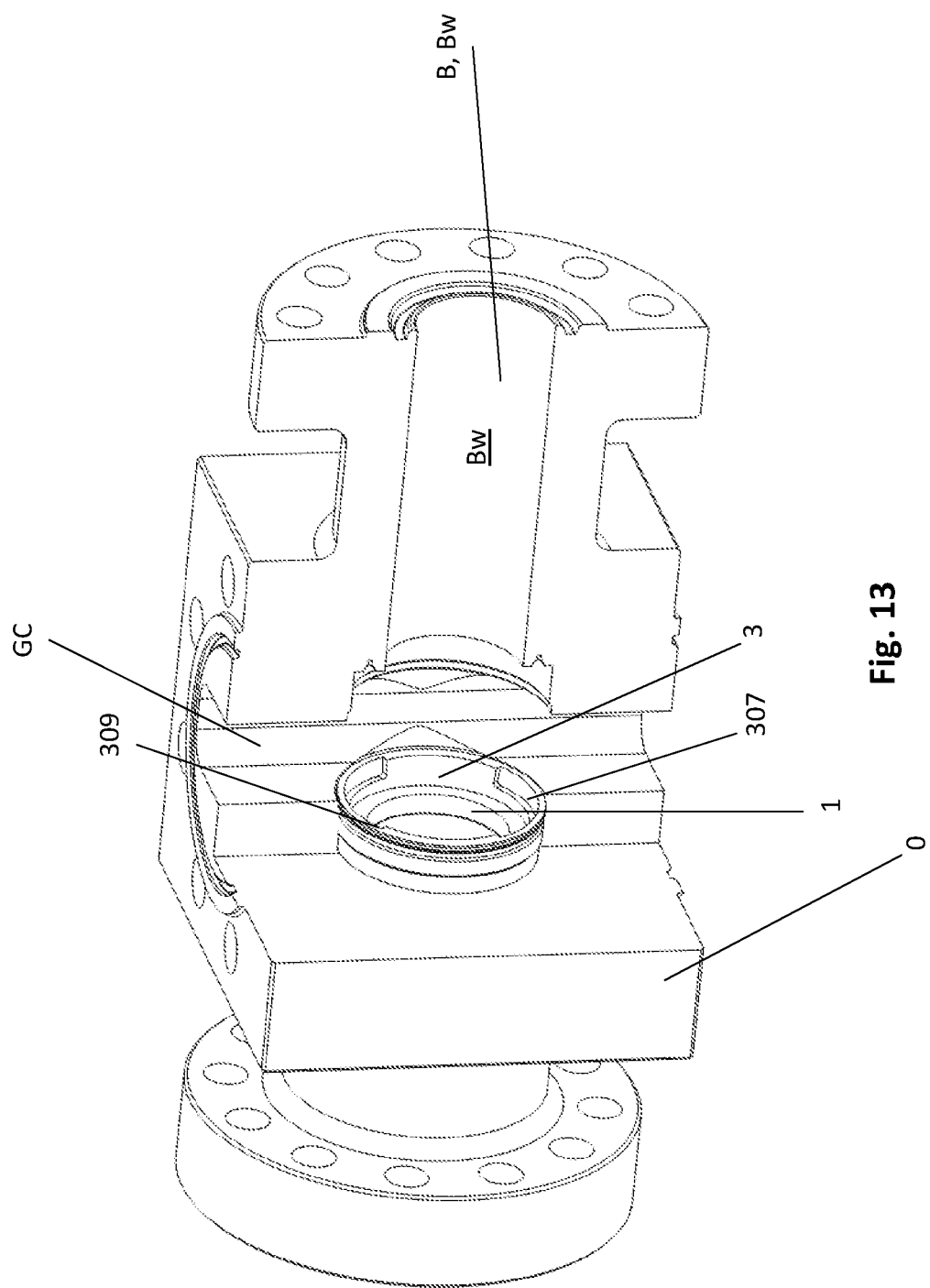
FIG. 13 shows a gate valve body portion, in a partly cut through illustration and shows a replaceable seat pocket (1, 3) (RSP) according to an embodiment of the invention, in its installed position.
Figure 14:
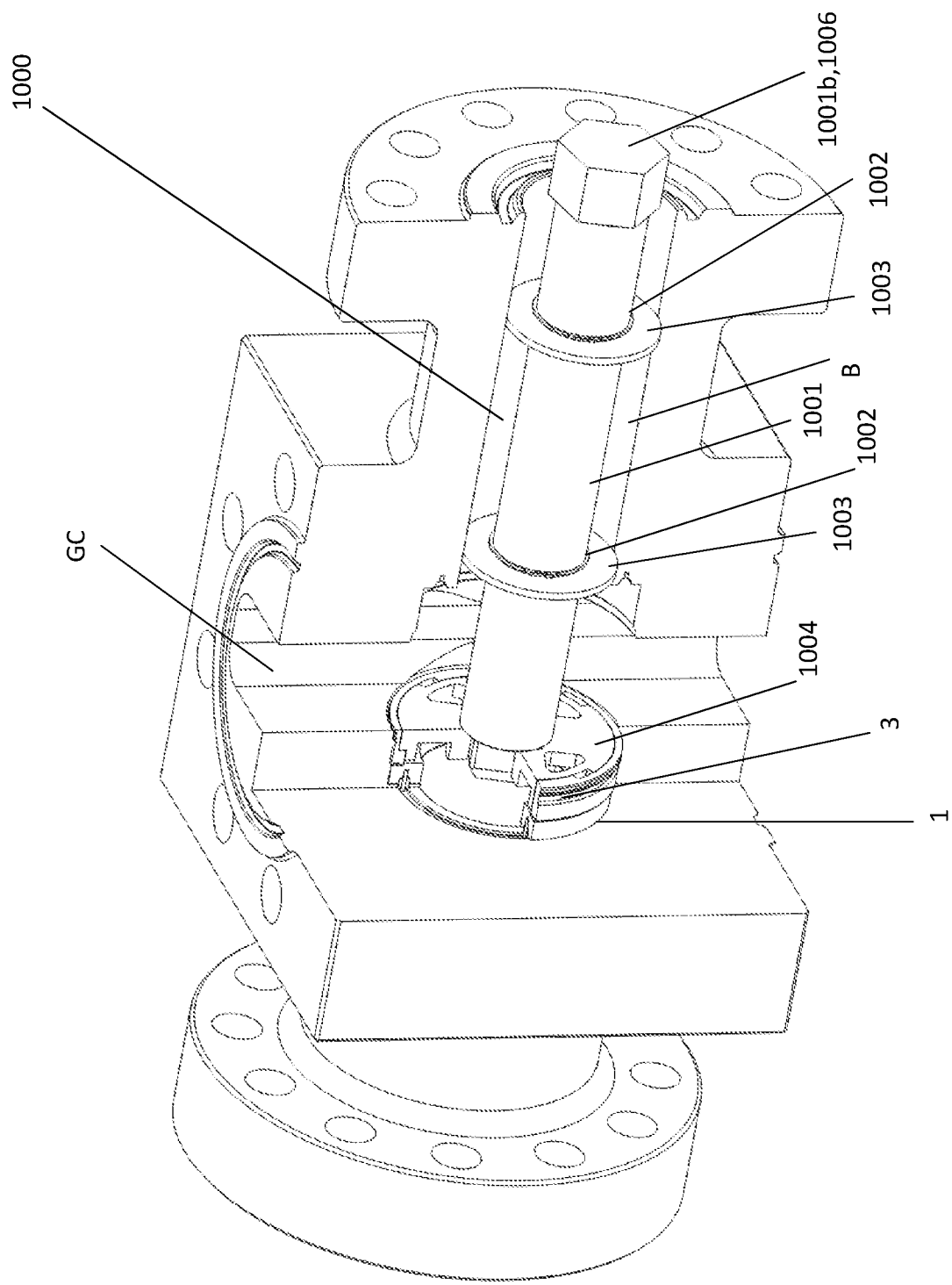
FIG. 14 is a similar illustration as FIG. 13 but with a replaceable seat pocket assembly installation tool (1000) according to an embodiment of the invention installed ready to be operated by an external torque tool.
Figure 15:
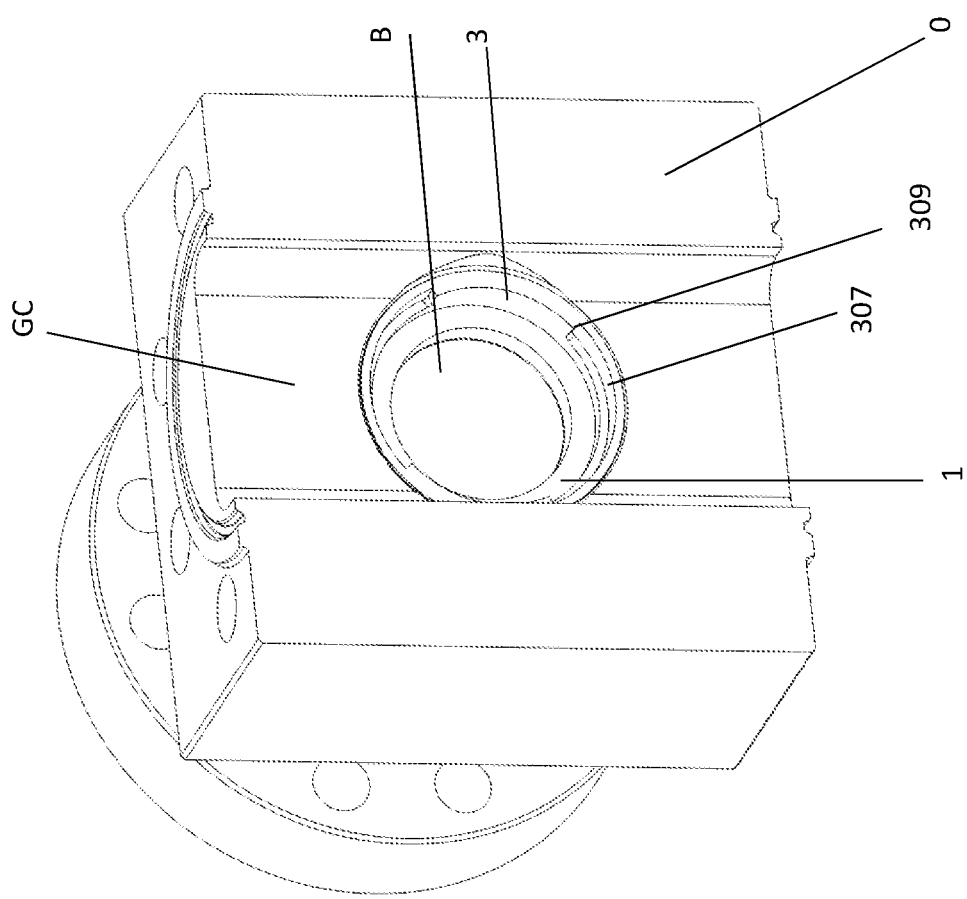
FIG. 15 shows a Replaceable Seat Pocket system according to an embodiment of the invention with the Energizing Retaining Collar (3) and Replaceable Seat Face (1) shown installed in valve body cut in half through the gate cavity (GC).
Figure 16:
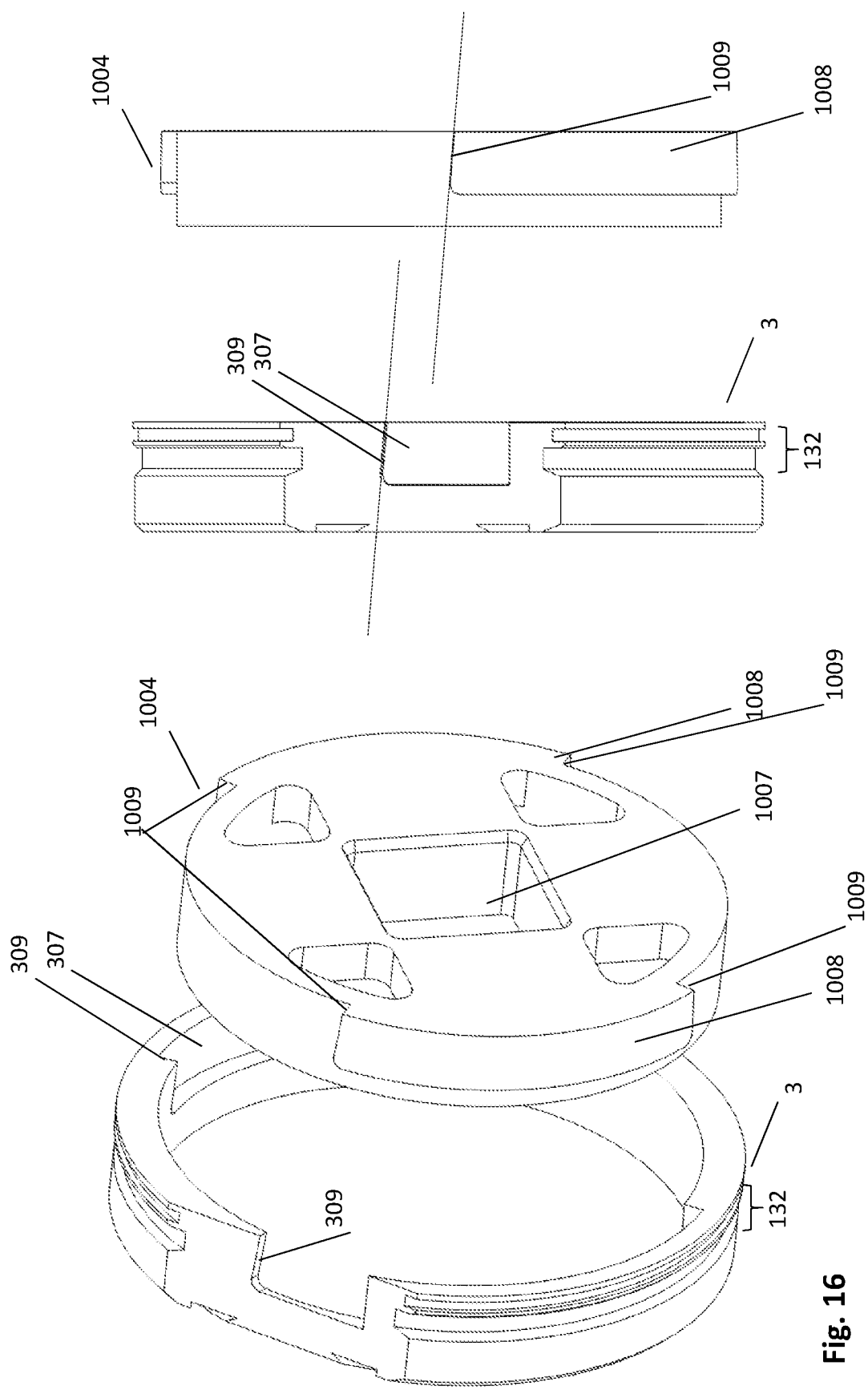
FIG. 16 shows an Energizing Retaining Collar (3) partly sectioned-off to show its angled load planes (309) and similar Torque Key (1004) with angled load plane (1009) views. This ensures that the torque key (1004) will not slip out axially during torque loading.
Figure 17A:
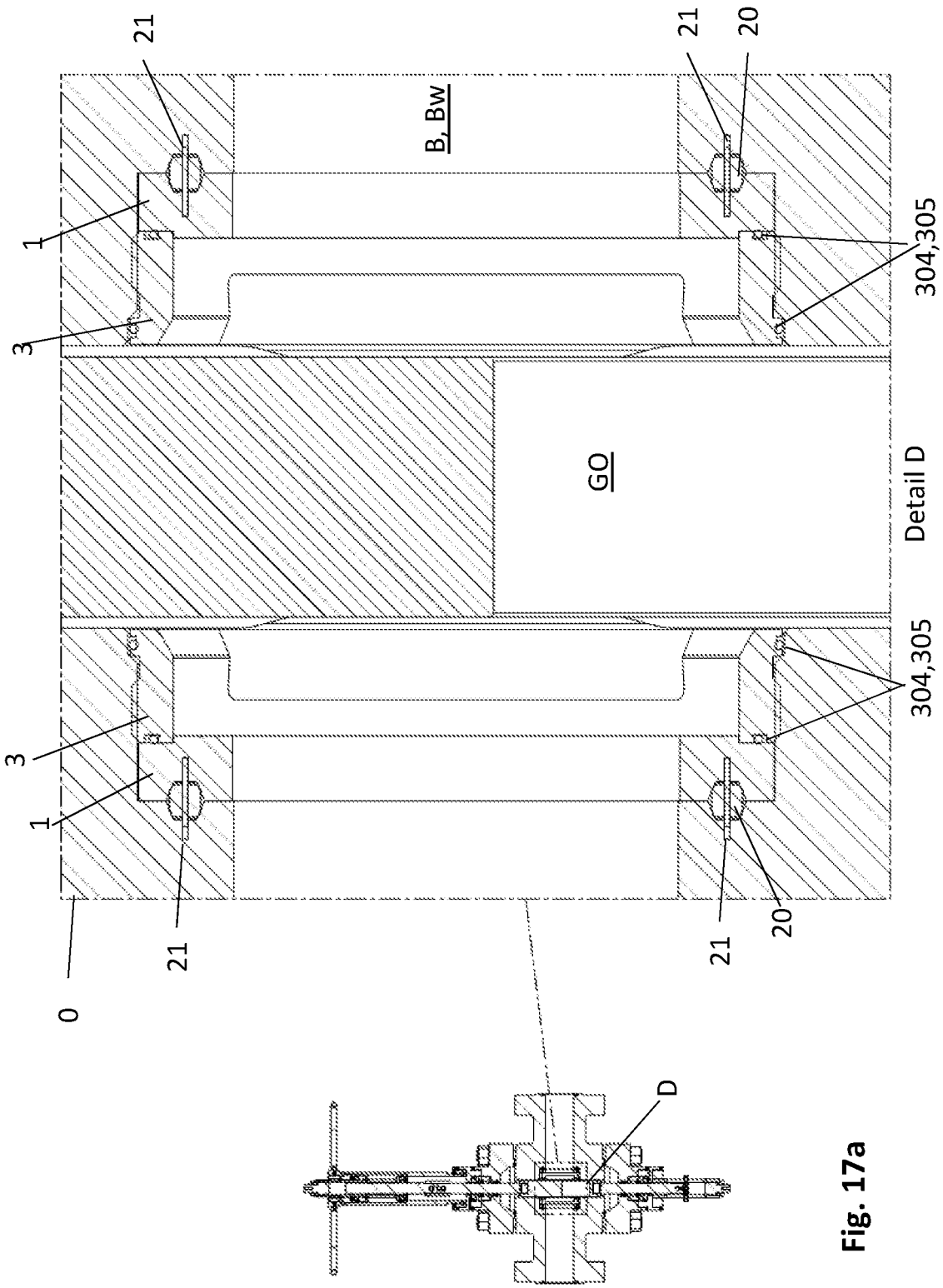
FIG. 17a is a section view of a gate valve with a RSP according to an embodiment of the invention with design for a special designed seat, i.e. with chamfer for a flared seat. The seat is removed. The right portion of the figure is enlarged detail D.
Figure 17B:
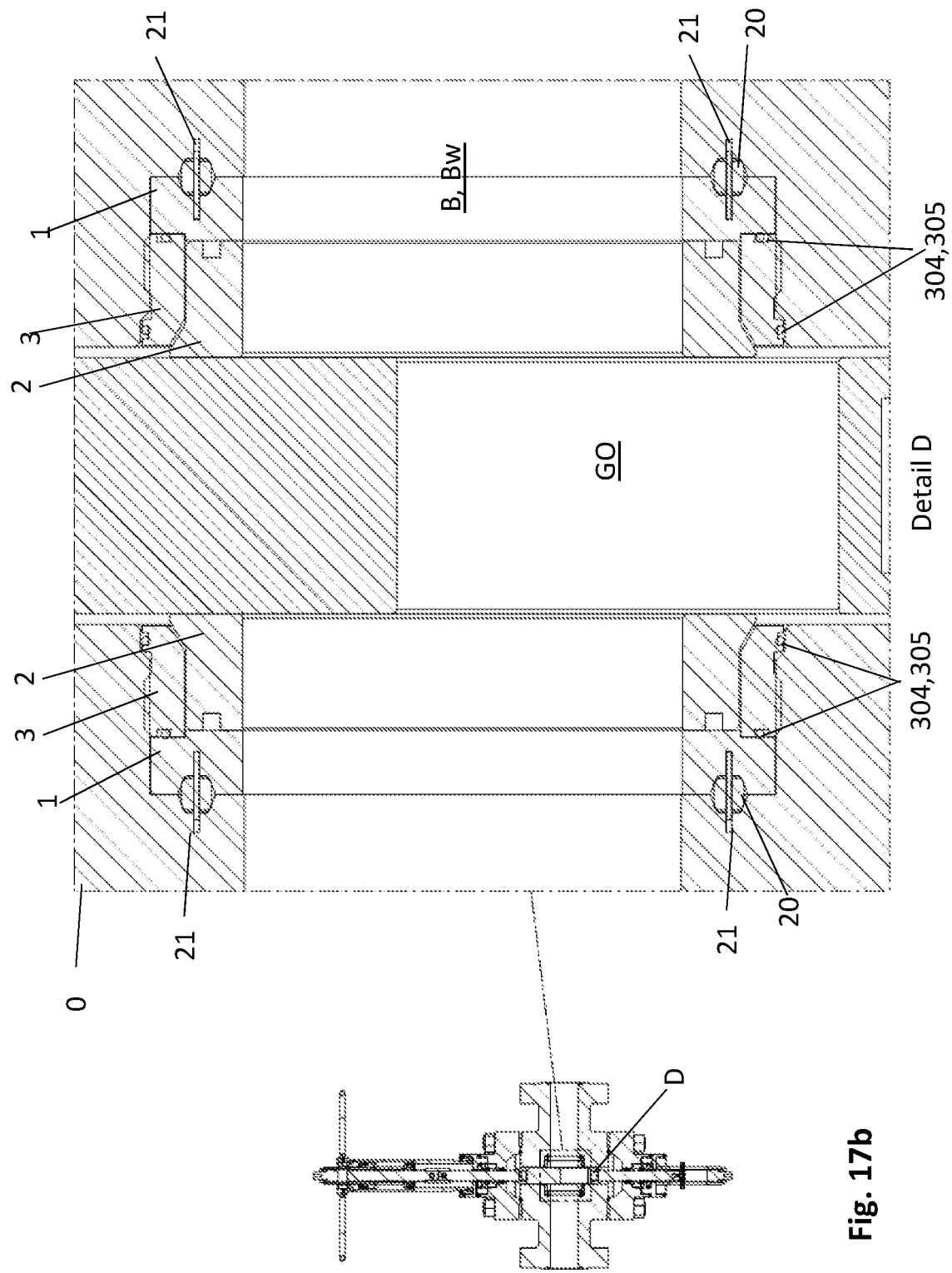
FIG. 17b is a section view of a gate valve with an RSP similar to FIG. 17a with the special designed seat, i.e. with chamfer for the flared seat (2) installed. The right portion of the figure is enlarged detail D.
Figure 18A:
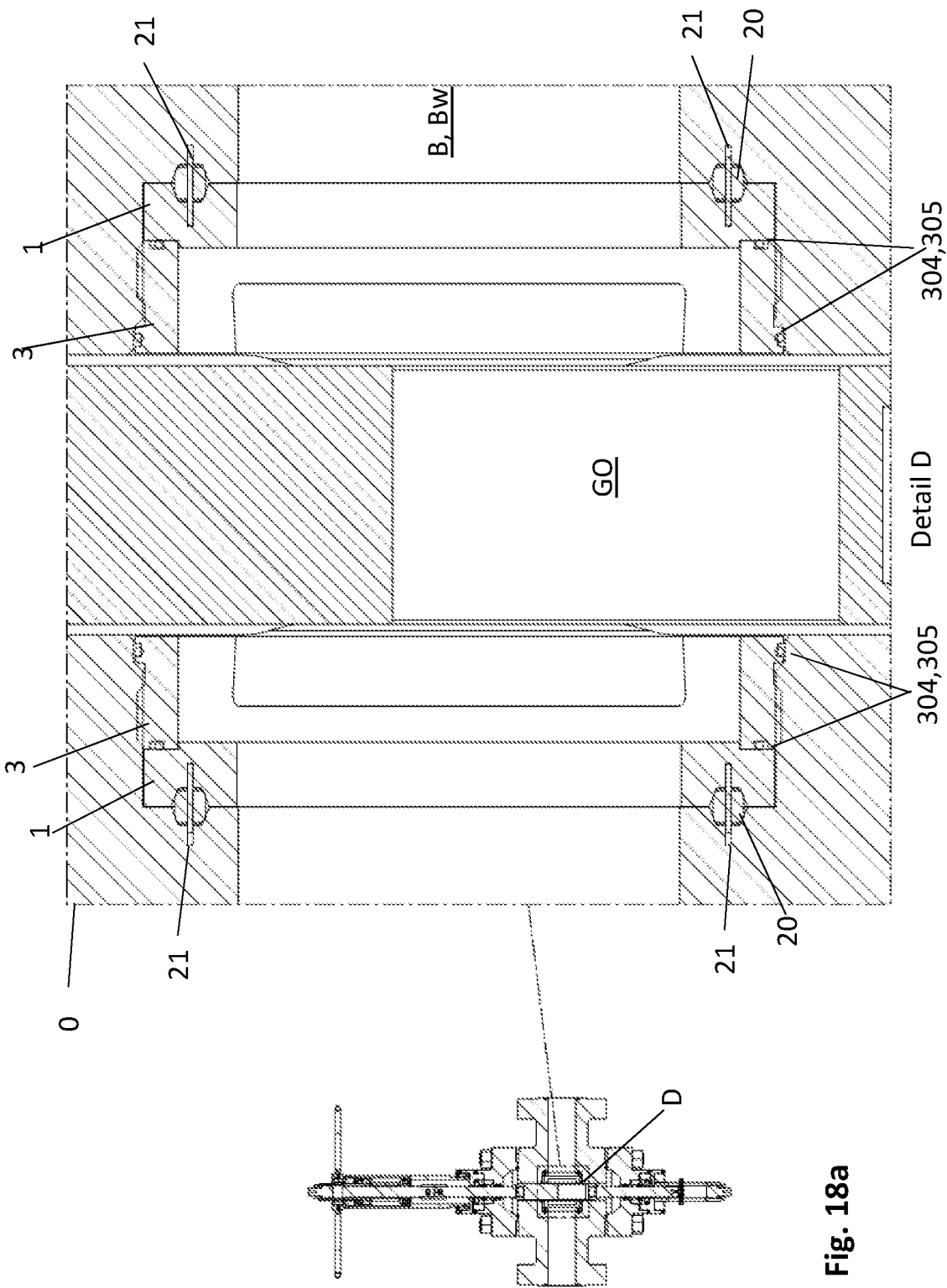
FIG. 18a is a section view of a gate valve with an RSP according to an embodiment of the invention with another energizing retaining collar (ERC) design. The seat is removed. The right portion of the figure is enlarged detail D.
Figure 18B:
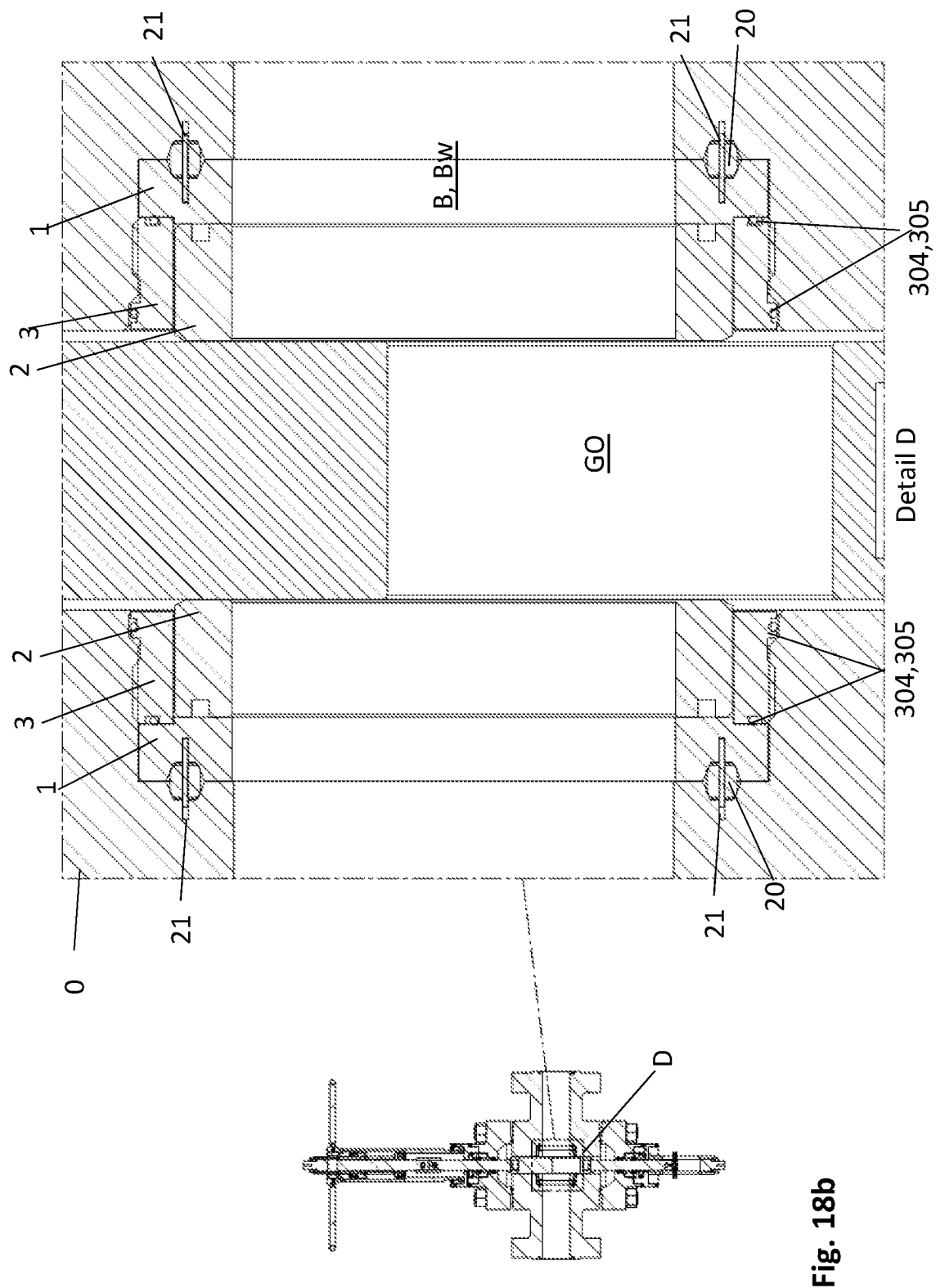
FIG. 18b is a section cut of a gate valve with an RSP similar to FIG. 18a with an installed seat (2). The right portion of the figure is enlarged detail D.

In an embodiment of the replaceable seat pocket assembly the energizing retaining collar (3) comprises one or more load slots (307) for engagement with a torque key (1004) of replaceable seat pocket assembly installation tool (1000), please see FIG. 12, FIG. 14, FIG. 16.

For installing or replacing the replaceable seat pocket RSP (1, 3, 10) according to the invention there was a need to develop a special tool which could apply a sufficient torque without risk of damage to the energizing collar (3) or the tool or the valve body. Thus, in another aspect of the invention also is a replaceable seat pocket assembly installation tool (1000) for a replaceable seat pocket assembly (10) according to the first aspect of the invention and comprises an extension rod (1001) and a torque key (1004), wherein the extension rod (1001) having a first end (1001a) arranged for engagement with the torque key (1004), and a second end (1001b) with a bolt head (1006) for a torque exerting tool such as a hydraulic torque tool, the torque key (1004) being generally circular with a central engagement slot (1007) for engagement with the first end (1001a) of the extension rod, and two or more arc-shaped load dogs (1008) on an outer circumference of the torque key (1004), the load dogs (1008) arranged for engagement with one or more corresponding arc-shaped load slots (307) in an energizing retainer collar (3) of the replaceable seat pocket assembly (10). The tool (1000), Torque Tool, is not assembled before the valve is opened and the gate (G) removed from the gate cavity (GC) and the flow bore (B) opened. The torque key and the extension rod shall be assembled when having been inserted through different paths of the valve body, i.e. through the gate cavity and the flow bore respectively.

The Torque Tool (1000) is used to energize the seal ring (3) by exerting torque to tighten the energizing retaining collar (ERC) (3). This should advantageously be done after the replaceable seat pocket assembly is mounted in place and hand tightened, then insert the torque key (1004) into the ERC (3) through the gate cavity (GC) and the extension rod through the bore (B).

The replaceable seat pocket assembly according to an embodiment of the invention comprises one or more centralizing stabilizer guide discs (1003) for arrangement onto the extension rod (1001) and for stabilizing the extension rod (1001) towards a wall (Bw) of the flow bore (B) in the gate valve body (0). One may achieve enough stability with a full-bore tool with an extension rod (1001) with the same diameter as the flow bore of the valve, but this would be a rather unmanageable tool to handle. It is important to stabilize the tool within the bore to ensure a correctly acting torque force and no skew force. After insertion of the torque key (1004), then, with the guide discs (1003) already installed on the extension rod (1001), insert the extension rod (1001) into the flow bore (B) and engage the square drive (1001b) of the extension rod (1001) with the square hole (1007) of the torque key (1004). Install one or more studs in the flange of the valve to anti-rotate the hydraulic tool. Tighten to the required to torque. The torque required may be very high in order to energize the seal (20).

In an embodiment of the invention the torque key has an engagement slot (1007) that is shaped as a square hole and the first end (1001a) of the extension rod is a square drive. Embodiments having other than square design may also be alternatives, the slot and pin may be "torque", triangular, or hexagonal, or equivalent, while having sufficiently robust profiles for transferring the high torque required.

In an embodiment of replaceable seat pocket assembly installation tool the load dogs (1008) has an angled load plane (1009) in at least one end of the arc-shaped load dog (1008) and a corresponding load plane (309) in the corresponding load slots (307) are angled correspondingly to receive the load dogs (1008) and prevent slip out of the torque key (1004) when subject to torque. The required torque for energizing the seal (20) is extremely high (design max of 10000 ft-lbf [13558 Nm] so the torque key (1004) and the energizing retaining collar (ERC) (3) have been designed with the angled load planes (1009) to pull the tool and ring (3) together and prevent slip-out.

In an embodiment of the replaceable seat pocket assembly installation tool, the extension rod (1001) comprises ring shaped grooves (1013) for split retainer rings (1002) for the centralizing stabilizer guide discs (1003). This is an essential feature to have the guide discs really centralized and tight placed to prevent wiggling and skew.

An advantage of the centralizing stabilizer guide discs is that the extension rod (1001) is kept perfectly axially aligned in the flow bore (B) when subject to torque, so as for avoiding undesired deviation away from the axially aligned position, which could otherwise damage the torque key (1004) or incur damage to the replaceable seat pocket assembly or the bore or the gate valve body. Significant high torque is required to energize the seat pocket assembly.

The invention is also a replaceable seat pocket kit comprising an installation tool assembly (1000) according to the second aspect of the invention and a replaceable seat pocket assembly (10) according to the first aspect of the invention.

The invention is also a method for installing a replaceable seat pocket assembly (10) in a gate valve comprising a gate valve body (0), a flow bore (B), a gate opening (GO), a gate (G), a gate cavity (GC), the valve body comprises a seat pocket interface recess (13) forming a receptacle around the flow bore (B) by the gate opening (GO), the recess (13) having a rear wall (131) and an inward facing circumferential side wall (130) with a threaded portion (132) close to the gate opening (GO), first operating through the gate cavity (GC), placing a seal ring (20) into a groove (19) in the rear wall (131) of the recess (13), placing a ring shaped replaceable seat face ring (1) with a front (11) and a reverse side (12), an outer circumference wall (101) and an inner circumference wall (100) with the reverse side (12) facing the seal ring (20) and the rear wall (131), arranging an energizing retaining collar (ERC) (3) onto an outer circumferential portion of the front (11) of the seat face ring (1), by engaging a threaded outer circumferential wall (302) of the energizing retaining collar (3) with the threaded portion (132) in the recess (13), inserting a circular torque key (1004) with one or more arc-shaped load dogs (1008) on its outer circumference and engaging the load dogs (1008) with one or more corresponding arc-shaped load slots (307) in the energizing retainer collar (3), then second, operating through the flow bore (B), inserting an extension rod (1001) through the flow bore (B), engaging a first end (1001a) of the extension rod (1001) into a central engagement slot (1007) of the torque key (1004) and using a torque tool (T) engaging a bolt head (1006) on a second end (1001b) of the extension rod (1001) and operating the hydraulic tool and tighten to a required torque. A torque tool (T) may be a hydraulic tool or any tool capable of exerting a high torque on the bolt head (1006) in order to screw in the ring (3) and energize the seal ring (20). The required torque for energizing the seal (20) is extremely high (design max of 10000 ft-lbf [13558 Nm]).

We have described that we place the seal ring (20) into a groove (19) in the rear wall (131) of the recess (13). We may also have a corresponding groove (16) in the rear face (12) of the ring (2) to engage the seal ring (20). We may also have only the groove (16) to retain the seal ring (20).

The method for removing the replaceable seat pocket is just the opposite sequence of the above method.

In an embodiment of the method according to the invention one will, ahead of the step of placing the ring shaped replaceable seat face ring (1) with a front (11) and a reverse side (12), an outer circumference wall (101) and an inner circumference wall (100) with the reverse side (12) facing the seal ring (20) and the rear wall (131), insert anti-rotation pins (21) in retainer holes (18) in the rear wall (131), the anti-rotation pins (21) matching corresponding retainer holes (17) in the reverse side (12) of the replaceable seat face ring (1).

One may arrange the anti-rotation lock pins (21) through axial-parallel through-holes (24) in the seal ring (20). This will prevent both the seal ring (20) and the replaceable seat face ring (1) from rotating when applying torque to the system and prevent excessive shear forces on the same. Thus, preventing undesired damage causing possible leakage etc.

Inserting lock pins (21) may be done ahead of placing the seal ring (20) into the groove (19) in order to place the seal ring and the anti-rotation pins in place at the same time and thus supporting the seal ring (20) before arranging the seat face ring (1). The specific sequence is up to the operator.

What is claimed is:

1. A method for installing a replaceable seat pocket assembly comprising:
    working through a gate valve body to perform the following steps:
        placing a replaceable seat face ring into said gate valve body;
        arranging an energizing retaining collar onto said seat face ring;
        inserting a torque key into said gate valve body and engaging said torque key with said energizing retainer collar;
        inserting an extension rod into said gate valve body and engaging a first end of said extension rod into said torque key and using a torque tool to engage a second end of said extension rod; and
        operating said torque tool to tighten to a required torque.

2. The installation method according to claim 1, wherein before the step of inserting the extension rod, arranging one or more stabilizing guide discs onto said extension rod.

3. The installation method according to claim 1, wherein before the step of placing said replaceable seat face ring;
    inserting anti-rotation pins in retainer holes in said gate valve body, said anti-rotation pins matching corresponding retainer holes in said replaceable seat face ring.

4. The installation method according to claim 1, wherein the arranging step further comprises: engaging a threaded outer circumferential wall of said energizing retaining collar with a threaded portion in said gate valve body.

5. The installation method according to claim 1, wherein engaging said torque key with said energizing retaining collar further comprises engaging a portion of said torque key with a corresponding opening in said energizing retaining collar.

6. The installation method according to claim 1, wherein before the step of placing said replaceable seat face ring:
    placing a seal ring into said gate valve body.

7. The installation method according to claim 6, wherein before the step of placing said replaceable seat face ring;
    inserting anti-rotation pins in retainer holes in said gate valve body; and
    arranging said anti-rotation pins through axial parallel through holes in said seal ring;
    wherein said anti-rotation pins match corresponding retainer holes in said replaceable seat face ring.

8. The installation method according to claim 6, wherein the step of placing the seal ring further comprises placing the seal ring into a rear wall of a recess of said gate valve body.

9. The installation method according to claim 8, wherein the step of placing the replaceable seat face ring further comprises placing the seat face ring adjacent said rear wall.

* * * * *